March 23, 1971 E. HUTTO, JR., ET AL 3,572,229
SPRING ACTUATED SEQUENTIAL COLOR FILTER FOR IMAGE TUBES
Filed Sept. 20, 1968
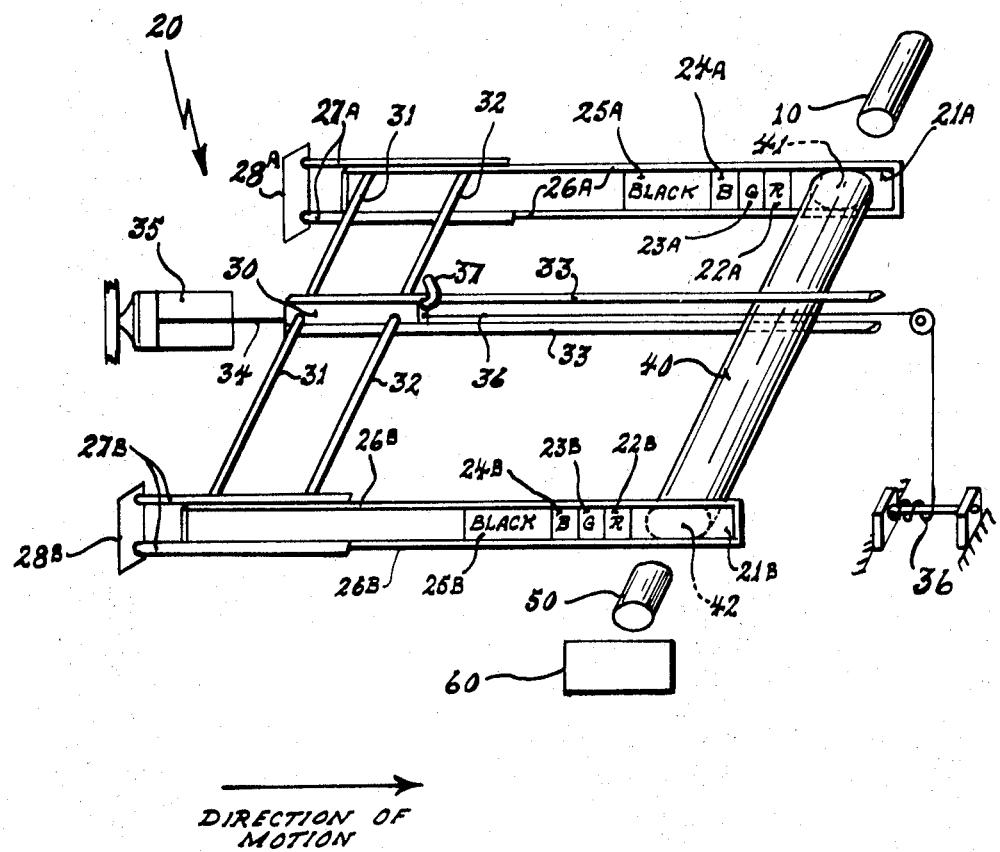
DIRECTION OF MOTION
INVENTORS.
EDGAR HUTTO JR.
PATRICK F. JOY JR.
ATTORNEYS

United States Patent Office 3,572,229
Patented Mar. 23, 1971

3,572,229
SPRING ACTUATED SEQUENTIAL COLOR FILTER FOR IMAGE TUBES
Edgar Hutto, Jr., Cherry Hill, and Patrick F. Joy, Jr., Bellmawr, N.J., assignors to the United States of America as represented by the Secretary of the Air Force
Filed Sept. 20, 1968, Ser. No. 761,110
Int. Cl. G03b 33/08
U.S. Cl. 95—12.2          1 Claim

ABSTRACT OF THE DISCLOSURE

A method and an apparatus for taking color photographs of subjects at low light levels. Red, green and blue color filters are moved sequentially and linearly across the input face of an image intensifier tube. Simultaneously, red, green and blue color filters are moved sequentially and linearly across the output face of the image intensifier tube, in synchronization with the filters moving across the input face. An objective lens is forward of the filters moving across the input face and a relay lens is to the rear of the filters moving across the output face. The objective lens, the image intensifier tube, and the relay lens are co-axial, having the same optical axis. The filters are in planes perpendicular to said axis. Color film, behind the relay lens and perpendicular to its optical axis is used as the recording medium for the resultant intensified color image.

BACKGROUND OF THE INVENTION

This invention relates to the taking of color photographs of subjects, i.e., objects and scenes at low light levels and, more particularly, to a spring actuated sequential color filter for use with an image intensifier tube in taking such photographs.

The viewing of subjects, i.e., objects or scenes, at low light levels is difficult at best and impossible in some situations. The probability of photographing such objects or scenes, rather than merely attempting to view them, is even more difficult when conventional photographic methods and apparatuses are used. The problem becomes even more complex when the image recording medium is color film, rather than black and white film, because of the relative insensitivity of the color film as compared to the black and white film.

The solution, at the optimum, is to increase the brightness of the image, which is below visual threshold, to a level where it can be readily seen with the unaided eye. Although this goal has not been achieved, to a great extent, it has been significantly approached by the invention of the image intensifier tube and by the manner of our application of it to color photography.

Since image intensifier tubes are well known in the art, it would not serve any useful purpose to describe the structure and operation of one. Suffice it to say that, by the use of an image intensifier tube, what is recreated at the output face of the tube is an intensified, i.e., brighter, form of the light image originally projected upon the input face of the tube, and that this increase in intensity, or "gain," may be made greater by increasing the stages of electron emission and electron multiplication.

Our invention incorporates an image intensifier tube; permits the taking of color photographs at low light levels, i.e., dim illumination conditions; and thereby solves a current critical state-of-the-art problem.

SUMMARY OF THE INVENTION

Our invention, a spring actuated sequential color filter, is particularly well-suited for use in a light-weight, field type, still camera with which color photographs are taken, at infrequent intervals, of subjects, i.e., objects and scenes, at low light levels.

Thus, an object of this invention is to provide a means for taking color photographs at low light levels, i.e., dim illumination.

Obviously, another object is to make such means lightweight and otherwise usable in the field.

Still another object is to provide a simple means of transporting color filters sequentially and linearly across the input and output faces of an image intensifier tube in synchronization.

These, and still other, objects of our invention will become readily apparent after a consideration of the description of the invention and reference to the drawing.

DESCRIPTION OF THE DRAWING

The drawing depicts, in simplified schematic form, a preferred embodiment of our invention.

DESCRIPTION OF THE PREFERRED EMBODIMENT

In essence, the drawing shows a preferred embodiment of our invention, in the form of a field type still camera, with the housing removed, with colored film therein.

The camera, less the housing, includes: an objective lens 10, a spring actuated sequential color filter assembly 20, a multistage image intensifier tube 40, a relay lens 50, and the color film 60.

All of the foregoing components, except spring actuated sequential color filter assembly 20, are well known in the art and therefore will not be described herein.

The spring actuated sequential color filter assembly 20, includes: (a) two (2) sets of a plurality of abutting vanes, one set at the input face end 41 of image intensifier tube 40 and the other set at the output face end 42 of image intensifier tube 40, having in sequence in each set, an opaque vane 21A and 21B, a red filter vane 22A and 22B, a green filter vane 23A and 23B, a blue filter vane 24A and 24B, and an opaque vane 25A and 25B; (b) a frame 26A and 26B to hold said vanes; (c) a fixed track or guide 27A and 27B on and within which frame 26A and 26B, respectively, can be moved forward or backward; (d) an abutment 28A and 28B to which fixed track or guide 27A, respectively, is affixed; (e) a plate 30; (f) rods 31 and 32 which link frames 26A and 26B to plate 30; (g) fixed track or guide 33 on and within which plate 30 can be moved forward and backward; (h) means 34 connecting one end of plate 30 to adjustable air-damped dash pot 35; (i) a suitably mounted constant force spring 36 connected to the other end of plate 30; and (j) a latch 37 which holds plate 30 in position.

It is here to be noted that objective lens 10, image intensifier 40, and relay lens 50 are co-axial, i.e., have a common optical axis and that the two sets of abutting vanes in frames 26A and 26B, and color film 60, are in planes perpendicular to that axis. In addition, opaque vanes 21A and 21B are of the same size; red filter vanes 22A and 22B are of the same size; green filter vanes 23A and 23B are of the same size; blue filter vanes 24A and 24B are of the same size; and, opaque vanes 25A and 25B are of the same size. Further, a white phosphor is used at image intensifier output face 42 to extend the spectral response throughout the visible spectrum. Also, image intensifier tube 40 is of the mutistage type.

The direction of motion is as shown in the drawing, i.e. from the reader's left to the reader's right. Rubber stops (not shown), at the reader's right, arrest the motion of frames 26A and 26B.

MODE OF OPERATION OF THE PREFERRED EMBODIMENT

In taking a low light level color photograph using our invention, latch 37 is tripped. As a result, constant force spring 36 coils, pulling plate 30 toward it at a uniform velocity. With the linear movement of plate 30, rods 31 and 32 affixed thereto at one end and affixed to frames 26A and 26B at their other ends, said frames 26A and 26B move linearly in the same direction as plate 30, also at a uniform velocity. Thus, opaque vanes 21A and 21B, which act as shutters, traverse and "uncover," respectively, the input 41 and the output 42 faces of image intensifier tube 40. Objective lens 10 then images the object or scene on to input face 41. The image is then intensified by multistage image intensifier tube 40 and the intensified image appears at phosphor output face 42. Then, sequentially red filter vane 22A, green filter vane 23A, blue filter vane 24A, and opaque vane 25A traverse the input face 41 of image intensifier tube 40. Simultaneously and sequentially, and in synchronization with the vanes in frame 26A, red filter vane 22B, green filter vane 23B, blue filter 24B, and opaque vane 25B traverse the phosphor output face 42 of tube 40. Due to the same starting time, the same (i.e. uniform) velocity, the same sizing, the same filters (or the opaque vanes), such as red filter vane 22A and red filter vane 22B, traverse and expose, respectively, the input face 41 and the output face 42, at the same time, for the same length of time. In summary, the movement of the vanes is synchronized. Therefore, as each of the colored filter vanes, such as 22A modifies in transmission, the image which impinged upon input face 41, the corresponding colored filter vane, such as 22B, behind the output face 42, imparts a hue to the intensified image. This image, in turn, is reimaged by relay lens 50 on to color photographic film 60. The resultant red-green-blue filtered-hued image is recorded on color film 60, resulting ultimately in a visually discernible colored photograph of an object or of a scene at low light level which could not be recorded by present state of the art methods or apparatuses.

It is to be noted that with an even stage image intensifier tube, such as 40, either of the magnetic or electrostatic type, the image orientation at the input face, such as 41, and at the output face, such as 42, is identical. Therefore, when, for example, red filter vane 22A filters the pictorial information to the left (i.e. reader's left) side of input face 41 of tube 40, red filter vane 22B at the output face 42 of tube 40 imparts a red hue to the corresponding image area to the left (i.e. reader's left) side of the output face 42 of tube 40. However, in an electrostatic-type image intensifier tube with an odd number of stages, the image at the output face of the tube is rotated with respect to the image at the input face. That is, an image at the left of the input face of the tube appears at the right of the output face. If an even stage electrostatic image intensifier tube is used, suitable linkage can be provided to permit filter vane travel in opposite directions.

It is also to be noted that: (a) opaque vanes, such as 21A, 21B, 25A and 25B, act as shutters and prevent light from striking the color photographic film, such as 60, except during the exposure sequence; (b) the air-damped dash pot 35, which damps the motion of spring 36 such that plate 30 and filter frames 26A and 26B move with a constant and uniform velocity, can be made to provide a wide range of filter vane velocities simply by adjusting the rate of escape of air from the dash pot; and (c) after the exposure sequence, the system is recocked manually.

While there has been shown and described the fundamental features of our invention, as applied to a preferred embodiment, it is to be understood that various substitutions and omissions may be made by those skilled in the art without departing from the spirit of the invention.

What we claim is:

1. An apparatus for taking color photographs at low light levels, comprising:
   (a) an objective lens, with an optical axis, for focusing and imaging the subject to be photographed;
   (b) means, rearward of said objective lens, for filtering and transmitting the focused image through red, green and blue filters, in sequence, wherein said means includes a frame holding, in sequence, an opaque vane, a red filter vane, a green filter vane, a blue filter vane, and an opaque vane, with said vanes being in a plane perpendicular to the optical axis of said objective lens;
   (c) an image intensifier tube, rearward of said filtering and transmitting means, for intensifying the filtered and transmitted image;
   (d) means for linearly moving the frame of said filtering and transmitting means across the front of said image intensifier tube;
   (e) means, rearward of said image intensifier tube, for passing and hueing the intensified image through red, green and blue filters, in sequence, and in synchronization with said filtering and transmitting means, wherein said passing and hueing means includes a frame holding, in sequence, an opaque vane, a red filter vane, a green filter vane, a blue filter vane, and an opaque vane, with said vanes being in a plane perpendicular to the optical axis of said objective lens;
   (f) means for linearly moving the frame of said passing and hueing means across the rear of said image intensifier tube;
   (g) a relay lens, with an optical axis coincident with the optical axis of said objective lens and with said relay lens disposed rearward of said passing and hueing means, for focusing the filtered, transmitted, intensified, and hued image on to color photographic film;
   (h) and, a housing to contain said objective lens, said filtering and transmitting means, said image intensifier tube, said frame moving means, said passing and hueing means, and said relay lens.

References Cited

UNITED STATES PATENTS

| | | | |
|---|---|---|---|
| 2,243,689 | 5/1941 | Waddington | 95—12.20 |
| 3,267,283 | 8/1966 | Kapany | 250—213X |
| 3,417,242 | 12/1968 | Windebank | 250—213X |

SAMUEL S. MATTHEWS, Primary Examiner

K. C. HUTCHISON, Assistant Examiner